(12) United States Patent
Walker et al.

(10) Patent No.: US 10,445,260 B2
(45) Date of Patent: Oct. 15, 2019

(54) DIRECT ACCESS TO HARDWARE QUEUES OF A STORAGE DEVICE BY SOFTWARE THREADS

(71) Applicant: Intel Corporation, Santa Clara, CA (US)

(72) Inventors: Benjamin Walker, Chandler, AZ (US); Daniel R. Verkamp, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 15/253,849

(22) Filed: Aug. 31, 2016

(65) Prior Publication Data

US 2018/0060256 A1    Mar. 1, 2018

(51) Int. Cl.
| | | |
|---|---|---|
| *G06F 13/16* | (2006.01) | |
| *G06F 17/30* | (2006.01) | |
| *G06F 9/30* | (2018.01) | |
| *G06F 16/13* | (2019.01) | |
| *G06F 16/176* | (2019.01) | |

(52) U.S. Cl.
CPC ........ *G06F 13/1642* (2013.01); *G06F 9/3009* (2013.01); *G06F 16/13* (2019.01); *G06F 16/1774* (2019.01)

(58) Field of Classification Search
None
See application file for complete search history.

*Primary Examiner* — Farley Abad
*Assistant Examiner* — Dayton Lewis-Taylor
(74) *Attorney, Agent, or Firm* — Compass IP Law, PC

(57) ABSTRACT

Methods of accessing hardware input/output (I/O) queues by software threads performing operations on a storage system, such as a filesystem, are described herein. In one embodiment, a method for performing I/O operations on a filesystem stored at least in part on a storage device involves creating a channel to map exclusively to one hardware I/O queue of the storage device. The channel includes an instance of a software primitive in the filesystem to route I/O requests to access objects in the filesystem from an application executing on one or more threads to the one hardware I/O queue to which the channel maps. The method also involves submitting the I/O requests to access the objects in the filesystem from at most one thread of the application at a given time to the one hardware I/O queue using the channel.

22 Claims, 10 Drawing Sheets

```
                    ┌─── 400A
```

CREATE A CHANNEL TO MAP EXCLUSIVELY TO ONE HARDWARE I/O QUEUE OF A STORAGE DEVICE
402

SUBMIT I/O REQUESTS TO ACCESS OBJECTS IN A FILESYSTEM FROM AT MOST ONE THREAD OF AN APPLICATION AT A GIVEN TIME TO THE ONE HARDWARE I/O QUEUE VIA THE CHANNEL
404

I/O Operation on Filesystem using Typed Channels –
Pseudocode
700

702   Spawn N threads
704   On each thread {
706       Obtain handle to global metadata channel;
708 --- Synchronize access to metadata channel across threads ---
710       Create a file using the metadata channel;
712       Resize the file using the metadata channel;
714 --- End synchronization ---
716       Create an I/O channel;
718       Read from or write to the file using the I/O channel;
720       Delete the I/O channel;
722   } End thread

FIG. 7

DIRECT ACCESS TO HARDWARE QUEUES OF A STORAGE DEVICE BY SOFTWARE THREADS

FIELD

The descriptions are generally related to methods of accessing hardware queues by software threads, and more particularly, methods of directly accessing hardware input/output (I/O) queues in a storage device by software threads performing operations on a storage system, such as a filesystem, database, or key/value (K/V) store.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2016, Intel Corporation, All Rights Reserved.

BACKGROUND

A typical computing system includes one or more processors with one or more processing cores to execute instructions. Multiple processing cores can enable concurrent execution of instructions on multiple software threads. In order to maintain integrity in a computing system supporting multiple software threads, the system typically uses locks to control access to shared system resources. A lock is a mechanism for controlling access by multiple threads of execution to a shared resource. In one embodiment, a lock is a variable that is accessible by multiple threads of execution, and which holds the state of the lock at any given instant in time to indicate whether the lock, and thus the shared resource controlled using the lock, is available at a given time. A system can use locks to ensure that multiple threads are not attempting to modify the same locations on a storage device simultaneously. However, the use of locks can have drawbacks. Locks can impact system performance by requiring threads to wait to acquire a lock prior to performing some operations, which prevents linear scaling of performance with additional CPU cores.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing at least one implementation of the invention that includes one or more particular features, structures, or characteristics. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 7 is an example of pseudocode for performing I/O operations using channels in a filesystem, in accordance with an embodiment.

Figure 1:
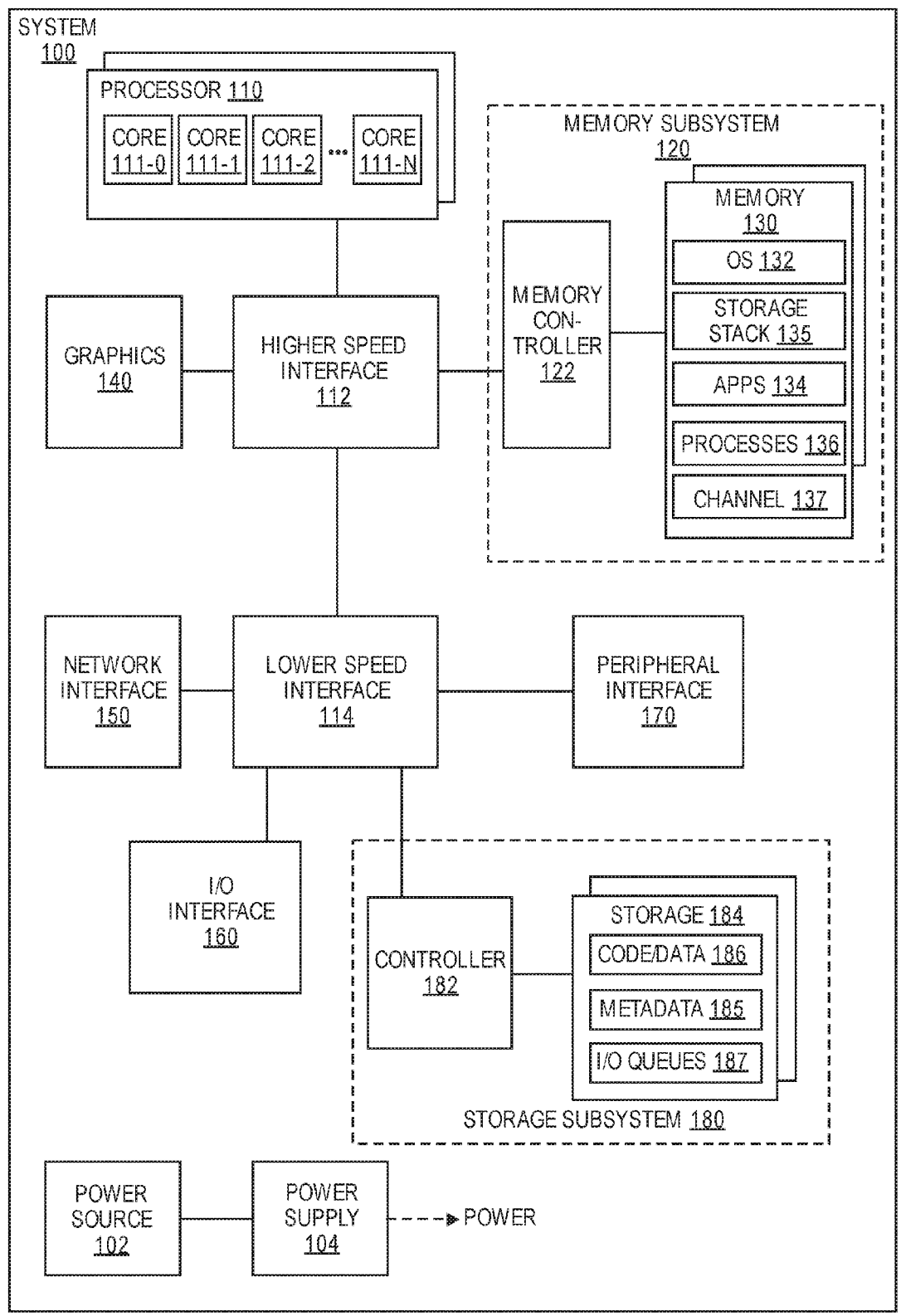
FIG. 1 is a block diagram of a computing system in which channels can be implemented for accessing hardware I/O queues by software threads in a filesystem, in accordance with an embodiment.

Descriptions of certain details and implementations follow, including a description of the figures, which may depict some or all of the embodiments described below, as well as discussing other potential embodiments or implementations of the inventive concepts presented herein.

DETAILED DESCRIPTION

Described herein are methods of accessing hardware input/output (I/O) queues of a storage device by software threads performing operations on a data storage system, such as a filesystem. A data storage system is a system for controlling how data is stored and accessed on a storage device of a computing system. Examples of a data storage system include: a filesystem, a database, and a key/value (K/V) store. The following description refers to a filesystem for illustrative purposes, however, the following description also applies to other types of data storage systems.

Applications can access objects in the filesystem, such as files, by performing input/output (I/O) operations on the filesystem. I/O operations to access an object in a filesystem can include, for example, requests to create or delete an object, read from an object, write to an object, or resize an object. In conventional systems, applications that perform operations on the filesystem do not have any control over which operations are performed on the physical storage device. For example, storage devices on which files are stored may have multiple hardware I/O queues for receiving input/output (I/O) requests. However, an application performing a read or write operation to access a file in the file system does not have knowledge of which hardware I/O queue of the storage device the request will be submitted to.

One scheme for determining which hardware I/O queue of a storage device a request will be submitted to is based on which processor core is executing the thread that makes the request. For example, in a system with one or more multi-core processors, an application can execute on multiple threads, and a given processor core can execute one or more threads of the application. In such a system, the operating system (OS) can map processor cores to specific hardware I/O queues of the storage device. Thus, when an application thread submits an I/O request to access objects in a filesystem, the OS selects the hardware I/O queue to submit the request to based on which processor core the thread happens to be running on.

Often, there are more processor cores in a system than hardware I/O queues, resulting in multiple processor cores being mapped to a single hardware I/O queue. For example, consider a system with one hardware I/O queue and two processor cores, each executing a thread. In one such example, the computing system relies on locks to ensure that threads being executed on the two processor cores are not attempting to submit I/O requests to the same hardware I/O queue at the same time. However, delays incurred due to locks can reduce system performance.

In contrast, in one embodiment, a software channel routes I/O requests from a thread to a hardware I/O queue to which the channel exclusively maps, shifting the onus of enforcing mutual exclusion amongst threads to the application and enabling the submission of I/O requests to hardware I/O queues without locking. In one embodiment, a channel is an instance of a software primitive that is exposed to applications (e.g., a filesystem or an application that accesses a filesystem), and which routes requests to access files in a filesystem to a specific hardware I/O queue on the storage device to which the channel is mapped. The application ensures that requests from at most one application thread are submitted using a given channel at a given time. Thus, in one embodiment, channels are lockless in terms of accessing the hardware I/O queues, instead leaving the enforcement of mutual exclusion across threads to the applications. A system implementing channels can therefore guarantee a certain amount of queue depth for a given application thread, which can enable stronger guarantees regarding quality of service. Channels can also improve system performance by enabling a user to write more efficient applications that take advantage of application knowledge rather than automatically locking for every I/O operation on a filesystem.

Additionally, in one embodiment, an application can create typed channels to separate requests that modify shared state from requests that do not modify shared state. For example, an application can create one metadata channel for requests that update a shared metadata region on a storage device and multiple I/O channels for requests that do not update the metadata region. The application can then submit I/O requests using appropriately typed channels based on whether or not the I/O request will modify metadata. In one such embodiment, the I/O operations that use the I/O channels can execute in parallel on multiple threads with no synchronization, which can further reduce or eliminate the use of locks.

FIG. 1 is a block diagram of a computing system in which channels can be implemented for accessing hardware I/O queues by software threads in a filesystem, in accordance with an embodiment.

System 100 represents a computing device in accordance with any embodiment described herein, and can be a laptop computer, a desktop computer, a server, a gaming or entertainment control system, a scanner, copier, printer, routing or switching device, embedded computing device, or other electronic device.

System 100 includes processor 110, which provides processing, operation management, and execution of instructions for system 100. Processor 110 can include any type of microprocessor, central processing unit (CPU), graphics processing unit (GPU), processing core, or other processing hardware to provide processing for system 100, or a combination of processors. Processor 110 controls the overall operation of system 100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices. The processor 110 illustrated in FIG. 1 is a multicore processor with N–1 processing cores 111-0-111-N. The processing cores 111-0-111-N include independent processing units for executing instructions. A multicore processor can execute instructions on multiple cores simultaneously. For example, each core of the multi-core processor can execute instructions belonging to a separate thread of execution simultaneously. A thread of execution (also referred to as an application thread) is an ordered list of instructions that a processor core can execute. Thus, on systems with multiple cores, the multiple cores can simultaneously execute multiple threads of execution.

In one embodiment, system 100 includes interface 112 coupled to processor 110, which can represent a higher speed interface or a high throughput interface for system components that needs higher bandwidth connections, such as memory subsystem 120 or graphics interface components 140. Interface 112 can represent a "north bridge" circuit, which can be a standalone component or integrated onto a processor die. The term "coupled" can refer to elements that are physically, electrically, and/or communicatively connected either directly or indirectly, and may be used interchangeably with the term "connected" herein. Physical coupling can include direct contact. Electrical coupling includes an interface or interconnection that allows electrical flow and/or signaling between components. Communicative coupling includes connections, including wired and wireless connections, that enable components to exchange data. Graphics interface 140 interfaces to graphics components for providing a visual display to a user of system 100. In one embodiment, graphics interface 140 generates a display based on data stored in memory 130 or based on operations executed by processor 110 or both.

In one embodiment, system 100 includes storage subsystem 180 to store data in a nonvolatile manner. In one embodiment, in certain system implementations, at least certain components of storage subsystem 180 can overlap with components of memory subsystem 120. Storage subsystem 180 includes storage device(s) 184, which can be or include any conventional medium for storing large amounts of data in a nonvolatile manner, such as one or more magnetic (in a Hard Disk Drive), non-volatile memory (in a solid state drive (SSD)), or optical based disks, or a combination. The storage device(s) 184 can include non-volatile memory (NVM) such as Flash memory (e.g., NAND Flash memory). In one embodiment, the storage device(s) 184 are compliant with NVM Express (NVMe) protocol. In one such embodiment, the storage device(s) 184 are non-volatile memory devices coupled with system via a Peripheral Component Interconnect (PCI), PCI Express (PCIe), or PCI Extended (PCI-X) interface. In one embodiment, the storage device(s) include byte accessible three-dimensional (3D) crosspoint memory.

Storage 184 holds code or instructions and data 186 in a persistent state (i.e., the value is retained despite interruption of power to system 100). Storage 184 can also include metadata 185. Metadata includes information about data 186 stored in storage 184 (e.g., objects such as files or blobs (binary large objects) in a filesystem of an operating system, entries in a database, or entries in a key/value (KV) store). An object is a data value that can be referenced by an identifier. Objects can include files, blobs, entries in a database, values in a KV store, or other objects of data. As mentioned above, a filesystem is a system for controlling how data is stored and accessed on storage 184. A filesystem can include, for example, a filesystem of an operating system. Other data storage systems can include a database, a key/value store, or other systems for controlling data storage and access. A database is a type of data storage system that is organized into entries to enable search and retrieval of data stored in the database. A key/value store is a type of database that associates stored values with a key to enable search and retrieval of the value using the key. Referring again to the metadata 185, in relation to a filesystem, the metadata 185 can include the size of file, access permission information (e.g., which users are allowed to access the file), when the file was last accessed, and where the physical locations of the file are on the storage device. In accordance with an embodiment, the metadata 185 is stored in non-volatile storage to persist across power cycles.

Storage device(s) 184 also include hardware I/O queues for storing information related to I/O requests. In one embodiment in which the storage device(s) 184 include NVMe devices, the hardware I/O queues include submission queues to which new I/O requests are submitted and completion queues to indicate completion of a request. For example, if an application is performing I/O operations on a filesystem stored in storage 184, the application submits (transmits) a request using the channel to the filesystem (which, in one embodiment, is a part of the OS). As mentioned above, I/O operations to access an object in a filesystem can include, for example, requests to create or delete an object, read from an object, write to an object, or resize an object. The term I/O operation is typically used to refer to the whole operation in software and at the device, whereas the I/O request to the initial request sent to the device (e.g., the term I/O request typically excludes the processing at the device and the subsequent completion message).

After the application submits a request on the channel to the filesystem, the filesystem then submits one or more requests to the storage device driver (which may or may not be a part of the OS) based on the request from the application. The storage device's driver then translates the request to a device-specific format and submits the translated requests to the hardware I/O queue. When the storage device completes the I/O requests, the reverse of the process happens with the completion message. For example, the storage device sends (transmits) a completion message to the storage device driver, which notifies the filesystem of the completion (with the same or modified completion message), which notifies the application of the completion (with the same or modified completion message).

Storage 184 can be generically considered to be a "memory," although memory 130 is typically the executing or operating memory to provide instructions to processor 110. Whereas storage 184 is nonvolatile, memory 130 can include volatile memory (i.e., the value or state of the data is indeterminate if power is interrupted to system 100). In one embodiment, storage subsystem 180 includes controller 182 to interface with storage 184. In one embodiment controller 182 is a physical part of interface 114 or processor 110, or can include circuits or logic in both processor 110 and interface 114.

Memory subsystem 120 represents the main memory of system 100, and provides storage for code to be executed by processor 110, or data values to be used in executing a routine. Memory subsystem 120 can include one or more memory devices 130 such as read-only memory (ROM), flash memory, one or more varieties of random access memory (RAM), or other memory devices, or a combination of such devices.

Memory 130 stores and hosts, among other things, an operating system (OS) 132 to provide a software platform for execution of instructions in system 100. Memory 130 also stores and hosts a storage stack 135, which includes software between applications and storage devices. For example, the storage stack 135 can include one or more of a database, key/value application programming interface (API), and a filesystem. The storage stack 135 can also include an Input/Output (I/O) queueing layer between applications and storage device hardware. The hardware storage devices typically have limits on the number of simultaneous requests that can be submitted, and also typically have a limited capability in ordering the processing of outstanding requests. An I/O queueing layer can hold excess requests beyond the hardware limit in memory until more requests can be submitted to the hardware and can also provide prioritization of requests (e.g., the I/O queuing layer can submit higher priority requests first). Additionally, applications 134 can execute on the software platform of OS 132 from memory 130. Applications 134 represent programs that have their own operational logic to perform execution of one or more functions. Applications 134 can include user applications, which are computer programs that perform functions (e.g., functions for a user) and run on the platform of the OS. Processes 136 represent agents or routines that provide auxiliary functions to OS 132 or one or more applications 134 or a combination. A given process can include one or more threads of execution, which can execute concurrently. OS 132, storage stack 135, applications 134, and processes 136 provide logic to provide functions for system 100.

In one embodiment, memory 130 stores channels 137, which are instances of a channel software primitive. In accordance with an embodiment, channels 137 route I/O requests (e.g., requests to access objects in the filesystem) from an application to a hardware I/O queue (e.g., one of the hardware I/O queues 187 of storage 184) to which the channel maps. Channels 137 map to I/O queues in a one-to-one fashion, such that a given channel maps exclusively to a single one of the I/O queues 187. A channel provides applications 134 with a handle which the applications 134 can use to submit I/O requests to access objects in a filesystem from a thread to the I/O queue to which the channel is mapped, regardless of which processor core is executing the thread. A channel can also be referred to as a "context" or a "software queue." Although the channels 137 are illustrated in FIG. 1 as being separate from the storage stack, the channels 137 can be included in the storage stack 135 or OS 132, for example.

In one embodiment, memory subsystem 120 includes memory controller 122, which is a memory controller to generate and issue commands to memory 130. It will be understood that memory controller 122 could be a physical part of processor 110 or a physical part of interface 112. For example, memory controller 122 can be an integrated memory controller, integrated onto a circuit with processor 110.

While not specifically illustrated, it will be understood that system 100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

In one embodiment, system 100 includes interface 114, which can be coupled to interface 112. Interface 114 can be a lower speed interface than interface 112. In one embodiment, interface 114 can be a "south bridge" circuit, which can include standalone components and integrated circuitry. In one embodiment, multiple user interface components or peripheral components, or both, couple to interface 114. Network interface 150 provides system 100 the ability to communicate with remote devices (e.g., servers or other computing devices) over one or more networks. Network interface 150 can include an Ethernet adapter, wireless interconnection components, USB (universal serial bus), or other wired or wireless standards-based or proprietary interfaces. Network interface 150 can exchange data with a remote device, which can include sending data stored in memory or receiving data to be stored in memory.

In one embodiment, system 100 includes one or more input/output (I/O) interface(s) 160. I/O interface 160 can include one or more interface components through which a user interacts with system 100 (e.g., audio, alphanumeric, tactile/touch, or other interfacing). Peripheral interface 170 can include any hardware interface not specifically mentioned above. Peripherals refer generally to devices that connect dependently to system 100. A dependent connection is one where system 100 provides the software platform or hardware platform or both on which operation executes, and with which a user interacts.

Power source 102 provides power to the components of system 100. More specifically, power source 102 typically interfaces to one or multiple power supplies 104 in system 100 to provide power to the components of system 100. In one embodiment, power supply 104 includes an AC to DC (alternating current to direct current) adapter to plug into a wall outlet. Such AC power can be renewable energy (e.g., solar power) power source 102. In one embodiment, power source 102 includes a DC power source, such as an external AC to DC converter. In one embodiment, power source 102 or power supply 104 includes wireless charging hardware to charge via proximity to a charging field. In one embodiment, power source 102 can include an internal battery or fuel cell source.

Figure 2:
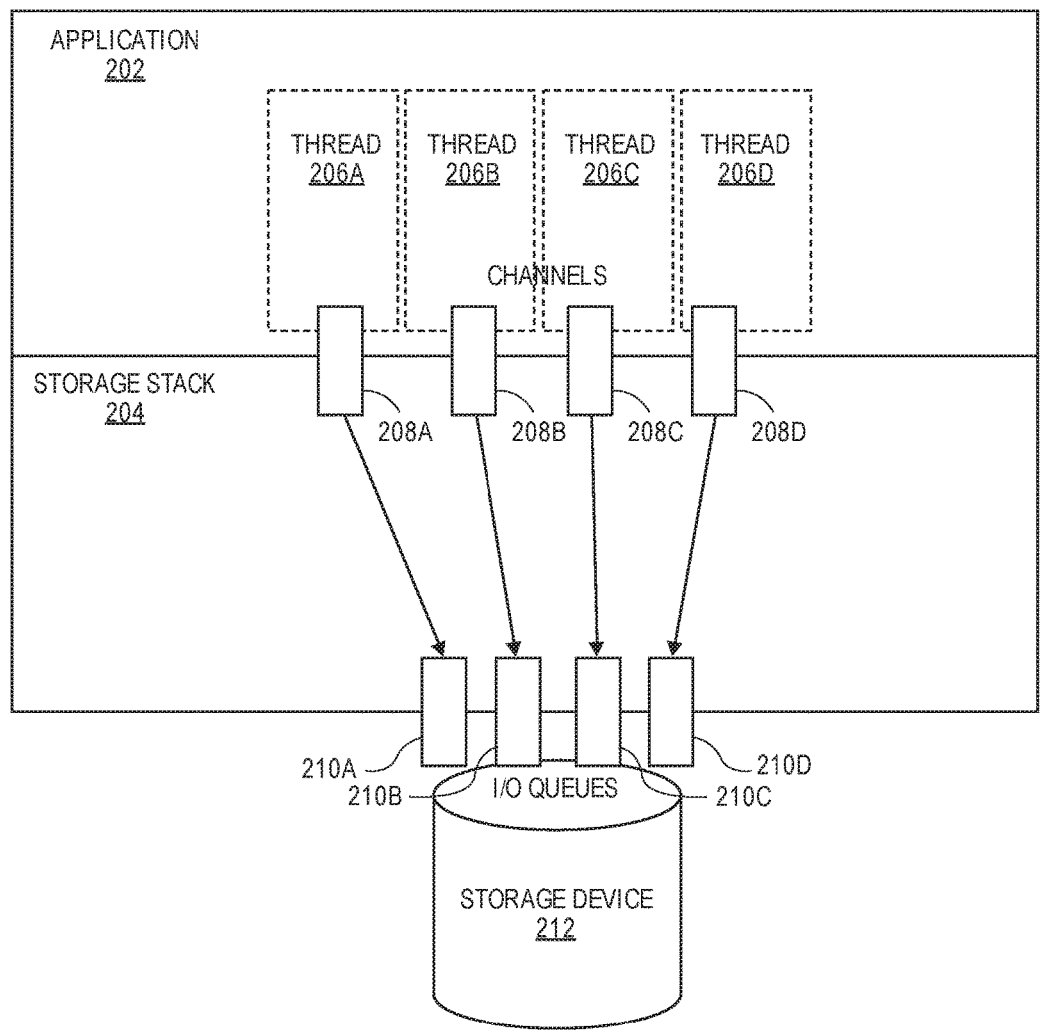
FIG. 2 is a block diagram depicting a system including channels, in accordance with an embodiment

FIG. 2 is a block diagram depicting channels, in accordance with an embodiment. FIG. 2 illustrates a storage device 212 for storing information, such as the data making up files in a filesystem. The storage device 212 can be the same as, or similar to, the storage device(s) 184 described with reference to FIG. 1. The storage device 212 includes hardware I/O queues 210A, 210B, 210C, and 210C for receiving I/O requests to access the information stored on the storage device 212. An application 202 executing on multiple threads 206A, 206B, 206C, and 206D performs operations on the filesystem stored at least in part on a storage device 212. As explained above with reference to FIG. 1, the threads 206A-206D can run on processor cores of a multicore processor, such as the processor 110 of FIG. 1. For example, a given core can execute one or more of the threads 206A-206D. In one example, a single thread runs on a single processor core. Other embodiments can include multithreaded systems that execute more than one thread on a single processor core.

The application 202 and storage device 212 are separated by a storage stack 204. The storage stack can be similar to or the same as the storage stack 135 described above with respect to FIG. 1. For example, the storage stack can include a data storage system such as described above with respect to the storage stack 135 of FIG. 1. For example, the storage stack can include one or more of a filesystem of an operating system, a database, a K/V API, and an I/O queueing layer.

In one embodiment, a plurality of channels 208A, 208B, 208C, and 208D map to the hardware I/O queues 210A, 210B, 210C, and 210D, respectively, and route requests to access the filesystem from the application 202 to the hardware I/O queue to which a given channel maps. The channels 208A-208D are software primitives that extend through the storage stack from the storage device hardware to the application 202. The channels 208A-208D extend through the stack in the sense that the application 202 and storage system (e.g., filesystem) have access to the channels, and the channels map all the way to the hardware (e.g., hardware I/O queues of the storage device 212). Thus, the channels differ from software abstractions (such as the context exposed by the asynchronous I/O library (libaio) in Linux) that exist only in software on top of the filesystem. Such software-only contexts do not extend through the entire storage stack and do not effect I/O operations below the application level (e.g., the libio context does not affect I/O operations at the filesystem level, OS, driver level, or in the hardware). For example, libaio contexts to not map to specific hardware I/O queues of a storage device. Furthermore, in a system using libaio contexts to manage I/O operations in an application, once the I/O requests enter the filesystem and block layers, the libaio context is not used.

In contrast, in one embodiment, each channel is an instance of a software primitive in the filesystem which is visible to the application 202, and which maps to a specific hardware I/O queue of the storage device 212. A channel is visible to the application in the sense that the application has a handle to the channel. A handle is a software abstraction that provides a reference to a resource (e.g., such as a reference to an instance of a channel primitive) to an application. An example of a handle to a channel is described below with respect to FIG. 3.

A given channel maps exclusively to one of the hardware I/O queues 210A-210D of the storage device 212 at a given time. For example, as illustrated in FIG. 2, channel 208A maps to I/O queue 210A, channel 208B maps to I/O queue 2106, channel 208C maps to I/O queue 210C, and channel 208D maps to I/O queue 210D. In the example illustrated in FIG. 2, the number of channels corresponds to the number of hardware I/O queues (e.g., there are four channels corresponding to four hardware I/O queues). In one embodiment, the number of channels can be less than or equal to the number of hardware I/O queues. The mapping of channels to hardware I/O queues can be done at application start-up (e.g., at system boot for a filesystem running on the OS, or application start-up for a database), at any point after boot while the system is running, or both. As an example, upon system start-up, an application creates a plurality of channels (e.g., channels 208A-208D), which each map exclusively to one hardware I/O queue of the storage device. The application spawns a plurality of threads of execution (e.g., threads 206A-206D), which submit I/O requests using handles to channels. For example, the threads 206A-206D of the application 202 execute operations including operations for accessing objects in the filesystem.

In conventional systems, the threads submit I/O requests for accessing objects in a filesystem without any knowledge of how the requests will be submitted to the I/O queues 210A-210D of the storage device. Such systems rely on locks (e.g., at the driver or OS level) to ensure that more than one thread does not submit requests to a given I/O queue simultaneously. In contrast, in one embodiment, the application is responsible for enforcing mutual exclusion on the channels across separate threads of execution. To enforce mutual exclusion at the application level (instead of the driver level), an application ensures that a given channel does not have more than one I/O request outstanding simultaneously submitted from different threads of execution. Therefore, in one such embodiment, because the application ensures that not more than a single thread uses a channel at a given time, the threads 206A-206D can submit requests to the hardware I/O queues 210A-210D using the channels 208A-208D without acquiring locks for the hardware I/O queues 210A-210D. By eliminating locks for accessing the hardware I/O queues, the application 202 can be written to be more efficient than if a global lock were always required for submitting I/O requests. For example, acquiring a lock takes finite time because the processor places barriers around memory access, even if the lock is not actually under any contention. Therefore, in a simple case when the application is only using a single thread of execution, the time taken to acquire a lock may be unnecessary. Even in a more complicated case, it may be possible for all of the computation in an application to be divided into independent units that read or write from distinct locations on the storage devices. For such applications that are separable, coordination between threads (e.g., via locks at the driver level) may be unnecessary. Thus, by enabling the application to coordinate amongst threads instead of automatically requiring locks, the overhead associated with locking can be reduced.

The application 202 can enforce mutual exclusion in a number of ways. For example, the application can use locks to control access to channels, or map the channels 208A-208D to the threads 206A-206D without the use of locks, in accordance with embodiments. For example, in one embodiment, the application 202 enforces mutual exclusion by mapping the channels 208A-208D to threads 206A-206D of execution in a one-to-one fashion. For example, as illustrated in FIG. 2, each of the threads 206A-206D of execution is mapped to one of the channels 208A-208D. The application can track which thread is mapped to which channel by holding a reference to a channel within the local scope of a particular thread of execution (or any other suitable mechanism for tracking the mapping that is accessible to the application). Because each thread is mapped to a single channel, which is mapped to a single hardware I/O queue, the thread can submit requests to the I/O queue without acquiring a lock and without the risk of another thread attempting to access the same I/O queue simultaneously.

In another embodiment, the application protects access to channels with a lock. A lock is a mechanism for controlling access by multiple threads of execution to a shared resource. In one embodiment, a lock is a variable that is accessible by multiple threads of execution, and which holds the state of the lock at any given instant in time to indicate whether the lock, and thus the shared resource controlled using the lock, is available at a given time. For example, when a resource is available for access by a thread, the state of the lock indicates that lock is available (e.g., not acquired, unlocked, not taken, or free). When a resource is unavailable (e.g., another thread is accessing the resource), the state of the lock indicates that the lock is unavailable (e.g., acquired, locked, taken, or held). A thread can call a function to acquire the lock, and another function to release the lock when the thread is done accessing the shared resource. An example of a lock includes a mutex, which provides for mutual exclusion between threads by preventing threads from executing one or more instructions from executing until the thread acquires the lock. For example, a section of code that is to access a shared resource in an application can be preceded by a function call to acquire a lock. In one such example, the thread executing the section of code cannot proceed to the instructions that access the shared resource until the thread acquires the lock (e.g., until the function returns with an indication that the thread has acquired the lock).

Thus, an application can use locks to enforce mutual exclusion amongst threads for accessing channels. In one such embodiment, a channel is not necessarily mapped to a specific thread of execution. Instead, any given thread can use the channel so long as it has acquired a lock for the channel. As an example, if the application creates two channels, any one of the threads of execution could use the channels so long as the application acquires the lock protecting the channel for the entire duration of their request. In an embodiment in which the application uses locks for accessing channels, the application can be written to minimize the use of locks, as mentioned above. If the application always acquires locks when attempting to use a channel, the end result may be similar to conventional systems that always acquire locks before submitting requests to hardware I/O queues. However, unlike conventional systems in which applications have no choice as to whether to acquire a lock, channels can empower the users to write applications to avoid the use of locks. Additionally, enforcing mutual exclusion for channels using locks (as opposed to mapping threads to channels) can have the benefit of integrating with existing pieces of software that were not designed around the concept of channels. For example, existing applications may have huge pools of threads that perform I/O operations, and that pool could be larger than the number of available channels. Instead of rewriting such applications, such applications can acquire locks for obtaining access to the channels.

Figure 3:
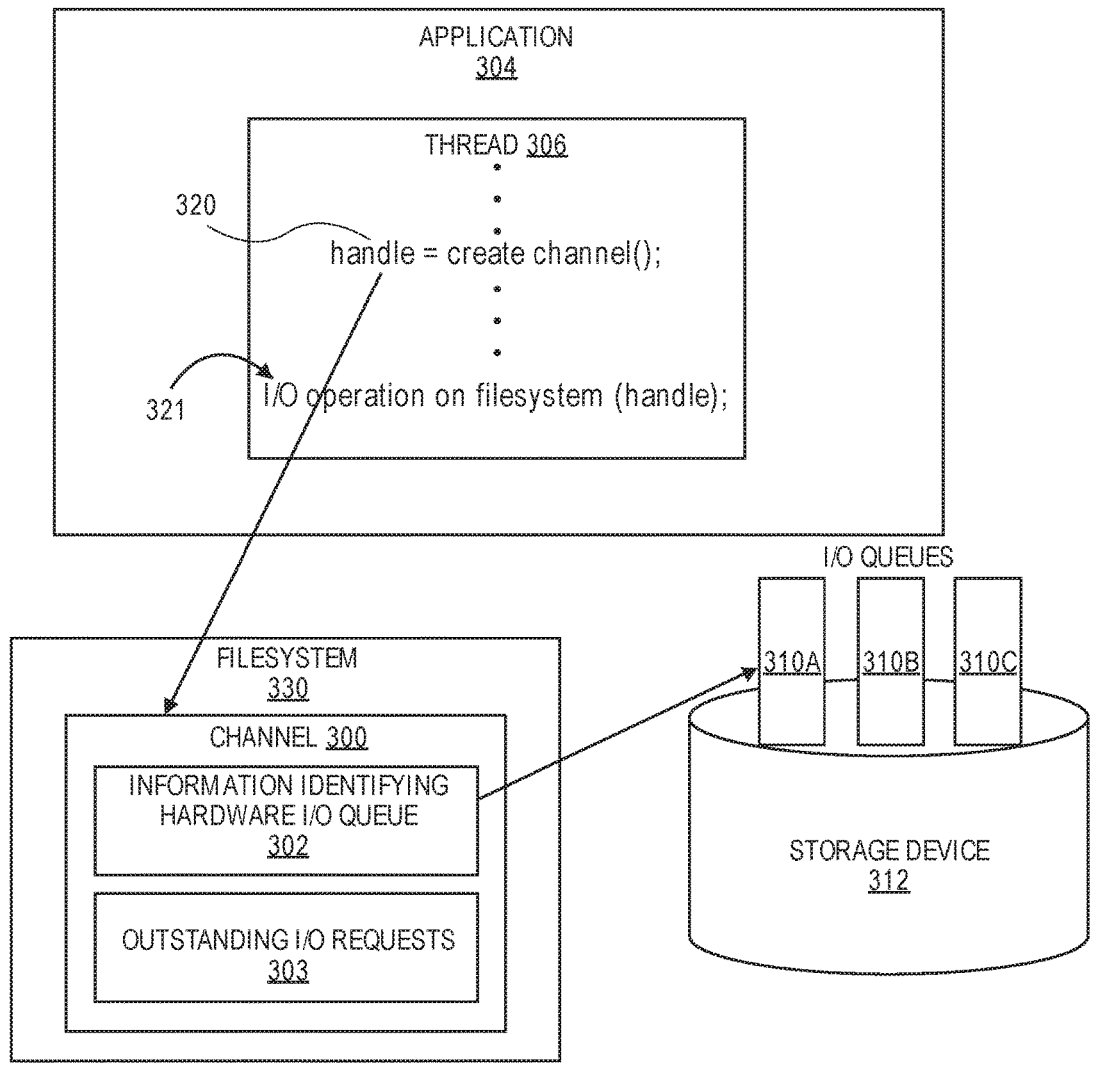
FIG. 3 is a block diagram illustrating a channel in relation to an application and hardware I/O queue, in accordance with an embodiment.

FIG. 3 is a block diagram illustrating a channel in relation to an application and hardware I/O queue, in accordance with an embodiment. In the embodiment depicted in FIG. 3, an application 304 (such as the application 202 of FIG. 2) executes on one or more threads. Although a single thread 306 of execution is depicted in FIG. 3, the application 304 can execute on multiple threads, such as shown in FIG. 2. The thread 306 executes a sequence of instructions for the application 304. In the example illustrated in FIG. 3, the thread 306 creates a channel 300 by calling a function that causes the filesystem 330 to create an instance of a channel primitive and return a handle 320 to the channel. In one embodiment, the channel 300 is a data structure that includes a reference to a hardware I/O queue (e.g., information 302 to identify the hardware I/O queue). In one embodiment, the channel 300 also includes a list of outstanding I/O requests to access the filesystem 330 (e.g., outstanding I/O requests 303). Because a single channel maps to a given hardware I/O queue with a given queue depth, the application can determine what the remaining available queue depth is at a given point in time by keeping track of outstanding I/O requests in the channel 300. Thus, creating a channel can involve calling a function, which creates an instance of a channel primitive and maps the instance to a single hardware I/O queue. If the attempt to create a channel succeeds, the channel (e.g., channel 300) maps to a hardware I/O queue, and includes information 302 identifying which hardware I/O queue (e.g., one of the hardware I/O queues 310A, 310B, or 310C of the storage device 312) to which the channel maps. Because a channel maps exclusively to a hardware I/O queue, it is possible that an attempt to create a channel can fail (e.g., if all the hardware I/O queues are already mapped to other channels). For example, the function called to create the channel can return an indication of failure to create a channel (such as a "0" or other indication of failure to create a channel) instead of a handle to the channel. In some cases, an application may not be able to start if the application cannot create a sufficient number of channels. In other cases, applications have logic to operate with fewer channels than desired.

In the illustrated embodiment, the handle 320 to the channel includes a reference to the channel 300. In one embodiment, the handle 320 to a given channel is a pointer to the instance of the channel 300. In one embodiment, the handle 320 to the channel is an opaque pointer in which the implementation details of the channel 300 are hidden from the application 304. In one embodiment in which the handle 320 is an opaque pointer, the application 304 cannot access the information stored in the instance of the channel (e.g., the information 302 identifying the hardware I/O queue), but has a pointer that the application can pass to other applications such as the filesystem. In other embodiments, the handle to the channel is a pointer that is not opaque (e.g., the application 304 has knowledge of at least some implementation details of the channel, and can access some or all information stored in the instance of the channel primitive using the handle 320).

After creating the channel, the thread can then perform an I/O operation 321 on a filesystem that is stored on the storage device 312 (e.g., by calling a function and passing the handle 320 to the function). The application 304 ensures that not more than a single thread uses the channel 300 at a time, which enables the request to be submitted to the I/O queue 310A to which the channel 300 is mapped without locking.

Figure 4A:
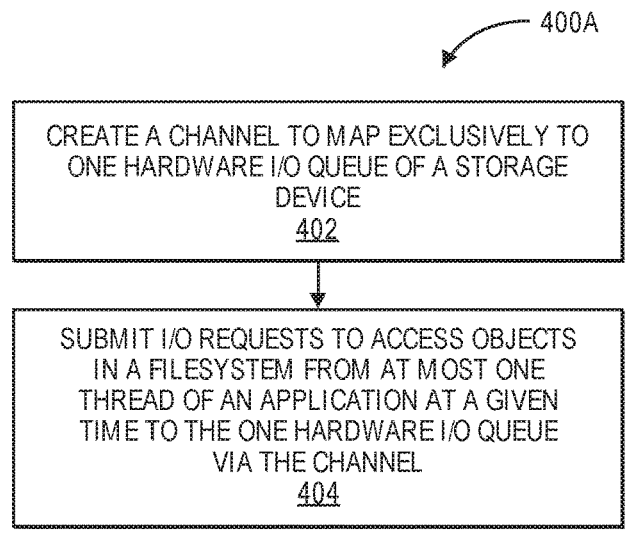
FIGS. 4A-4C are flowcharts of methods of using channels to perform I/O operations on a filesystem, in accordance with an embodiment.
Figure 4B:
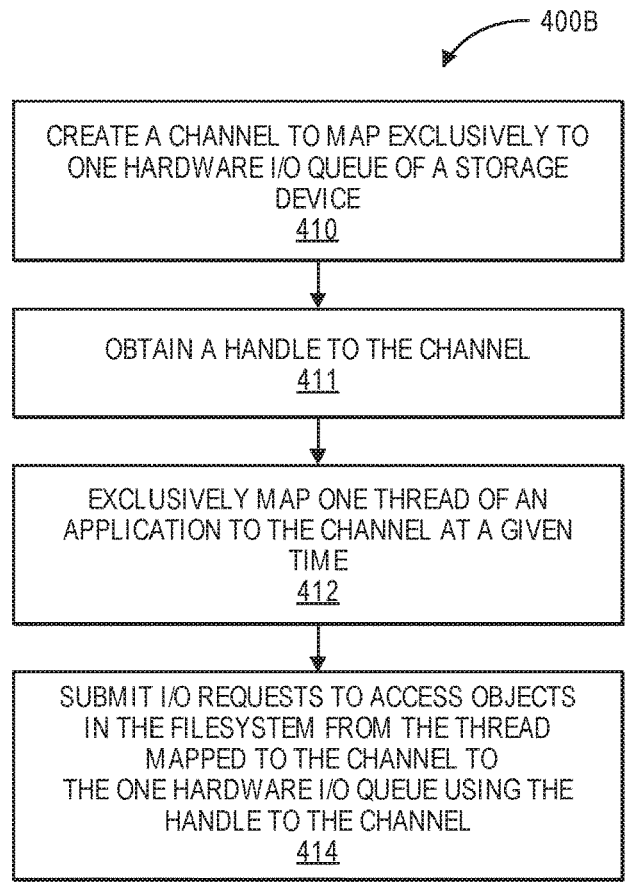
Figure 4C:
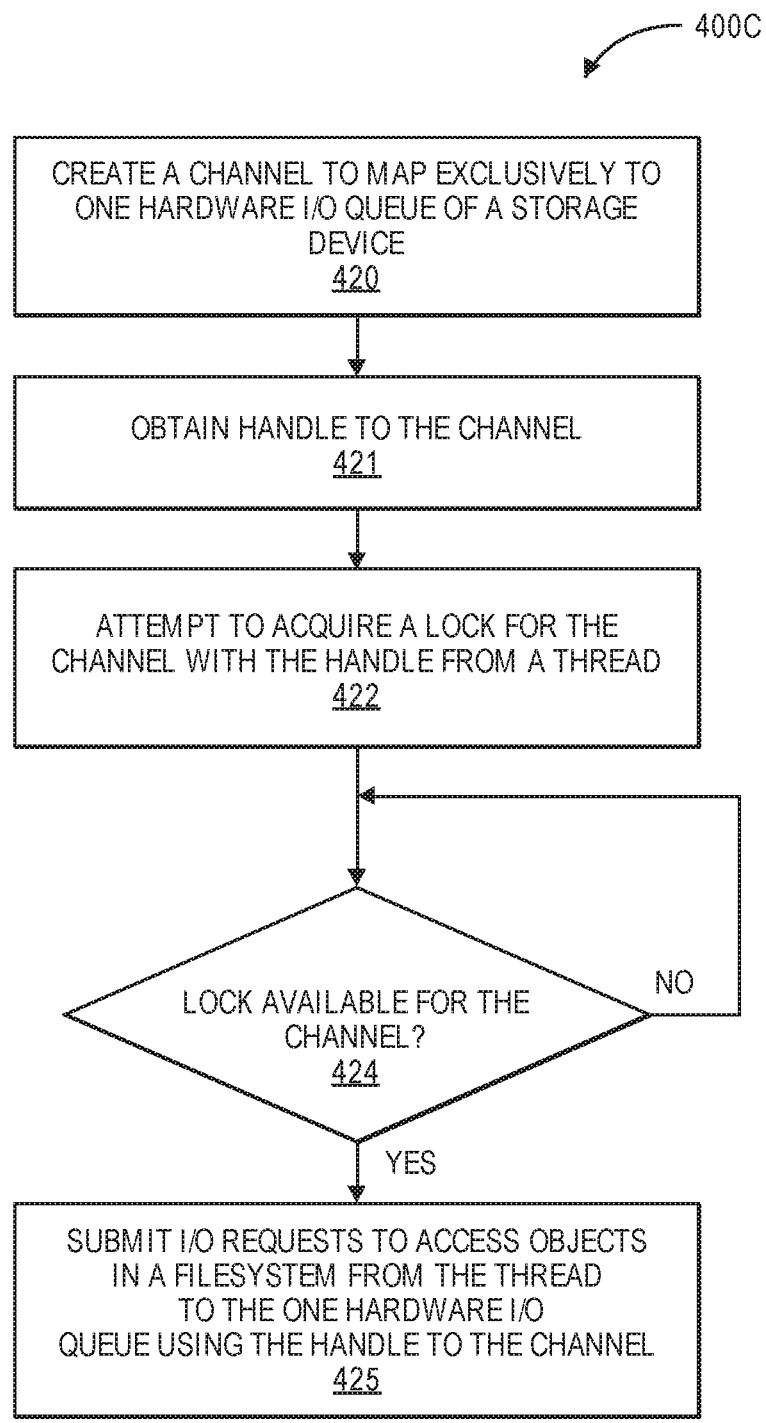

FIGS. 4A-4C are flowcharts of methods of using channels to perform I/O operations on a filesystem, in accordance with an embodiment. The following description refers to an application (such as the application 202 of FIG. 2) as performing the methods of FIGS. 4A-4C. However, some or all of the operations in the methods of FIGS. 4A-4C can be performed by other software or firmware including: an application, a data storage system, an operating system, storage device driver, or a combination.

Referring to FIG. 4A, the method 400A begins with the application creating a channel to map exclusively to one hardware I/O queue of a storage device, at operation 402. In one embodiment, creating a channel involves calling a function that creates an instance of a channel primitive (e.g., such as the channel 300 FIG. 3) and returns a handle to the instance of the channel primitive. In one embodiment, calling the function to create the instance of the channel primitive causes the filesystem to allocate memory for the instance of the channel primitive. After creating the instance of the channel primitive, the filesystem requests an available hardware I/O queue from the device driver, and stores information in the instance of the channel primitive to identify the hardware I/O queue. Thus, in one embodiment, the application requests that the filesystem create a channel, and the filesystem requests a free hardware I/O queue from the device driver for the storage device and stores the reference to the hardware I/O queue in the channel. As mentioned above, the channel can be created at application start-up or at any other time during the runtime of the application. Although this example refers to the filesystem as creating the instance of the channel primitive, the channel primitive could be instantiated by other software or firmware such as the operating system or storage device driver.

Once the channel is created, the application can submit I/O requests to access objects in a filesystem via the channel, at operation 404. In accordance with an embodiment, the application submits I/O requests from at most one thread of an application at a given time to the hardware I/O queue via the channel. In one embodiment, submitting the I/O requests involves calling an I/O function to perform an I/O operation on the filesystem with the handle to the channel (e.g., as illustrated by the operation 321 of FIG. 3). In one such embodiment, the I/O function is to cause the I/O requests to be submitted to the hardware I/O queue to which the channel maps. Because the application ensures that I/O requests are submitted from at most one thread at a given time, locks are unnecessary for protecting the I/O queues from submissions from multiple channels simultaneously. FIGS. 4B and 4C illustrate methods of ensuring that the I/O requests are submitted from at most one channel at a time.

Referring to FIG. 4B, a method 400B begins with creating a channel to map exclusively to one hardware I/O queue of a storage device, at operation 410. The operation 410 can be the same or similar to the operation 402 of FIG. 4A, described above. Once the application creates the channel, the application obtains a handle to the channel, at operation 411. For example, as explained above with reference to FIG. 3, the application can call a function to create the channel, and the function returns a handle to the channel.

The method 400B further involves exclusively mapping one thread of execution to the channel at a given time, at operation 412. For example, the application (e.g., the application 202 of FIG. 2) can map a single thread (e.g., thread 206A of FIG. 2) to a single channel (e.g., channel 208A of FIG. 2) by holding a reference to a channel within the local scope of the thread. The application can then submit I/O requests to access objects in the filesystem from the thread of execution that is mapped to the channel using the handle to the channel, at operation 414. As mentioned above with respect to FIG. 4A, submitting I/O requests can involve, for example, calling a function to perform an I/O operation, and passing the handle to the channel to the function. In the method described in FIG. 4B, threads are mapped to channels in a one-to-one manner, which eliminates the need for locks for accessing the hardware I/O queues to which the channels map.

FIG. 4C illustrates another method for using channels to perform I/O operations on a filesystem. Like the methods 400A of FIG. 4A and method 400B of FIG. 4B, the method 400C starts with creating a channel to map exclusively to one hardware I/O queue of a storage device, at operation 420. Also like the method 400B of FIG. 4B, the method involves obtaining a handle to the channel, at operation 421.

After creation of the channel, in order to perform an I/O operation on a filesystem, an application thread attempts to acquire a lock for the channel with the handle to the channel, at operation 422. If the lock for the channel is available (e.g., if another thread has not already acquired the lock), 424 YES branch, the application thread can submit I/O requests to access objects in the filesystem using the channel, at operation 425. If the lock for the channel is not available, (e.g., if another thread has acquired the lock), 424 NO branch, the application waits to submit its I/O requests via the channel. Thus, the method 400C enables the performance of I/O operations on a filesystem using locks on channels as opposed to locks for the hardware I/O queues. Using locks on channels instead of requiring locks for hardware I/O queues can enable application code to be written to be more efficient by minimizing the use of locks rather than always requiring locking for hardware queues whenever an I/O request is submitted.

Figure 5A:
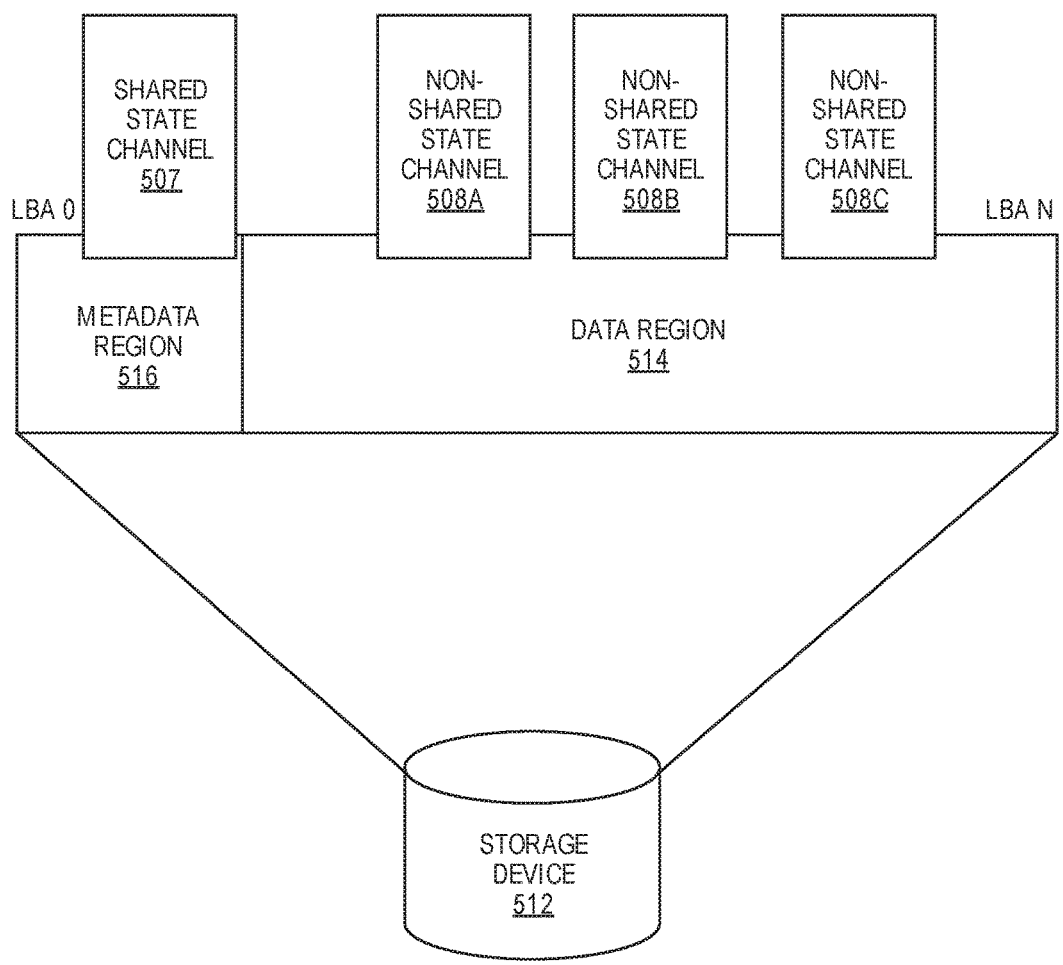
FIG. 5A illustrates an example of a system with typed channels, including one shared state channel and multiple non-shared state channels, in accordance with an embodiment.

As mentioned briefly above, channels can be typed based on whether the channels will be used to modify shared state. The shared state includes information stored on the storage device that multiple threads of execution access as a result of using the filesystem. For example, FIG. 5A illustrates an example of a system with one shared state channel 507 and multiple non-shared state channels 508A-508C, in accordance with an embodiment. The channels illustrated in FIG. 5A can be substantially the same as the channels 208A-208D of FIG. 2, except the channels in FIG. 5A include typed channels based on whether the channels are used for accessing shared state. For example, an application uses the shared state channel 507 for operations that modify shared state, and the non-shared state channels 508A-508C for operations that do not modify shared state.

As an example, consider an application that is performing operations on files in a filesystem. In one such example, the file is made up of data stored in the data region 514 (e.g., the data 186 of FIG. 1), and metadata about the file stored in a metadata region 516 (e.g., the metadata 185 of FIG. 1). In the example illustrated in FIG. 5A, the metadata region 516 begins at LBA0 (logical block address 0) and occupies a number of logical blocks on the storage device 512. The data region 514 occupies another region of logical blocks on the storage device (e.g., starting at the block where the metadata region 516 ends to LBA N (logical block address N). One challenge in performing I/O operations on files in a filesystem is that such operations often require updating metadata. As mentioned above, metadata can include the size of a file, access permission information (e.g., which users are allowed to access the file), when the file was last accessed, and where the physical locations of the file are on the storage device, for example. Metadata for different files is typically grouped together and stored in a common location on a storage device, as illustrated by the metadata region 516 of the storage device 512. Therefore, I/O operations to different files can result in modifying the same shared state. Conventional systems typically implement additional locking (e.g., locking around the shared state in addition to locks for accessing the hardware I/O queues of the storage device) to prevent multiple I/O operations from attempting to modify the same shared state simultaneously.

In contrast, typed channels enable explicitly separating the operations that result in modifying shared state from operations that do not modify shared state. Referring again to the example above where an application is performing operations on files in a filesystem, the operations can include, for example: create a new file, delete a file, resize a file, write to a file, and read from a file. Such operations can be separated into metadata modifying operations (create a file, delete a file, and resize a file), and operations that an application can perform without modifying metadata (write to a file and read from a file). In conventional systems, the operations that modify metadata require acquiring a lock, while the operations that do not modify metadata typically do not require acquiring a lock. For example, in one embodiment, the data region 514 is divided up and allocated to objects. The description of this allocation is in the global metadata. When performing I/O operations that do not modify metadata, most systems do not coordinate such accesses and leave it to the application write to a file from at most one thread at a time. Alternatively, a storage system can define an "open" operation that is exclusive to a single thread of execution and uses a global lock to coordinate. If a thread is able to successfully open the file, the thread can proceed with reading or writing to the physical storage space allocated to that file. In contrast, when performing operations that do modify metadata, conventional systems typically require acquiring a lock.

In a typical system, read and write operations are significantly more common than operations that modify metadata. Therefore, an application can submit the relatively uncommon metadata-modifying operations from a single thread using a single shared state channel, while the application can perform operations that do not modify metadata using many channels simultaneously. The application can then limit the use of locks for accessing the shared state to the I/O requests made using the shared state channel, and can avoid locking around the shared state for I/O requests made using the non-shared state channels. In the illustrated example where the shared state channel is for accessing metadata, the channel can be referred to as a "metadata channel," and the non-shared state channels can be referred to as "I/O channels."

Figure 5B:
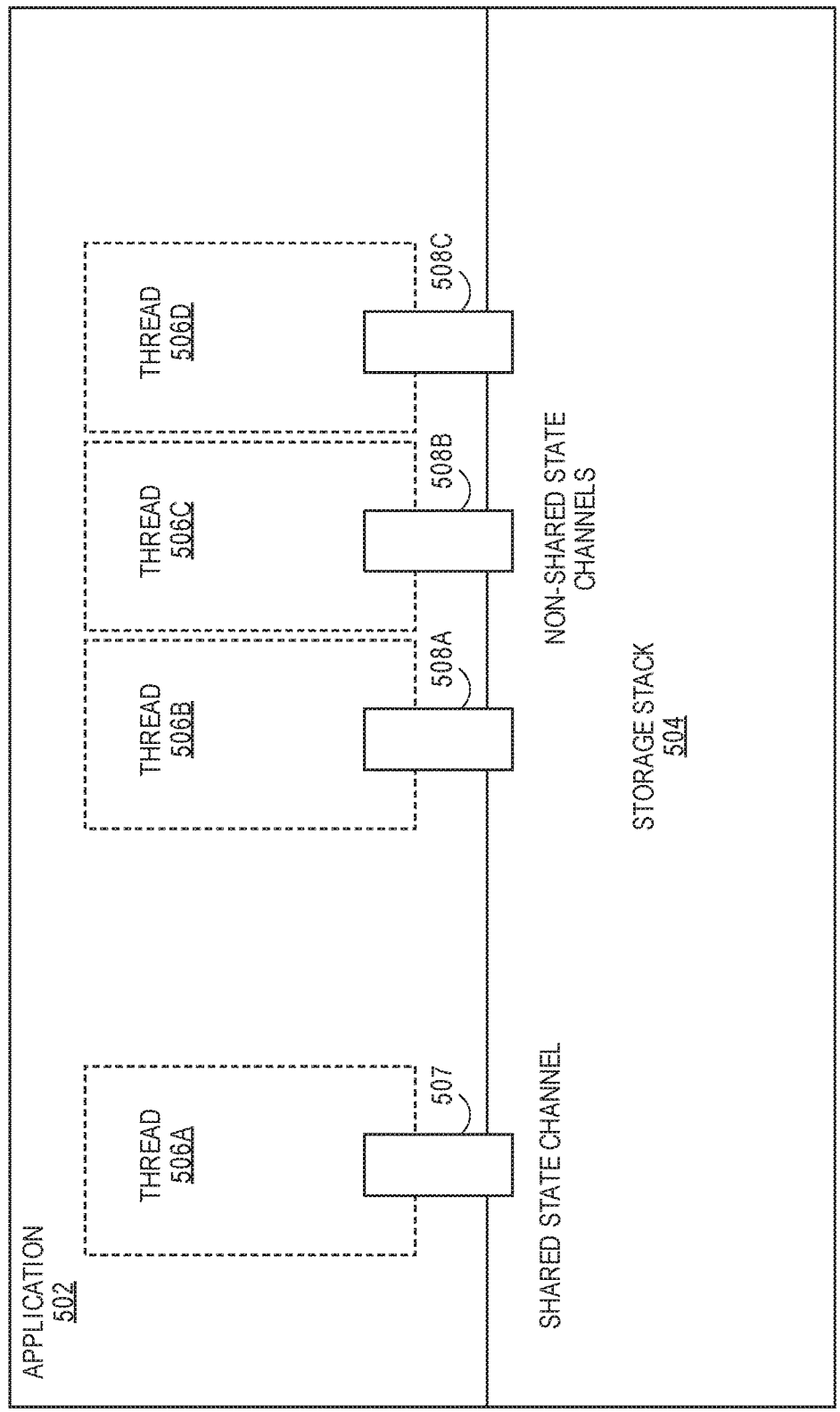
FIG. 5B illustrates typed channels relative to application threads, in accordance with an embodiment.

Additionally, like the channels 208A-208D of FIG. 2, an application executing on multiple threads ensures that at most one thread is using a given channel at a given time, in accordance with embodiments. For example, FIG. 5B illustrates typed channels relative to application threads, in accordance with an embodiment. Similar to FIG. 2, FIG. 5B illustrates an application 502 running on multiple threads 506A-506D and a storage stack 504. The application 502 can be similar to or the same as the application 202 described with respect to FIG. 2. The storage stack can include software between the application 502 and storage devices (not shown in FIG. 5B). For example, the storage stack 504 can include one or more of a database, key/value application programming interface (API), a filesystem, and an I/O queueing layer.

In one embodiment, the application creates a single shared state channel and multiple non-shared state channels. In one such embodiment, because there is only one shared state channel, the threads are not mapped to the shared state channel, but instead any thread can use the shared state channel 507 by first acquiring a lock for the shared state channel 507. The non-shared state channels can be mapped or not mapped (and instead acquired with a lock, for example). In an example where none of the channels are mapped (and threads acquire locks to access either the shared or non-shared state channels), a thread that is to perform an I/O request that does not modify shared state can first obtain a handle to one of the non-shared state channels 508A-508C (and a lock for accessing the non-shared state channel), and submit the request using the handle to the non-shared state channel. Obtaining exclusive access to a non-shared state channel can involve calling a function to either create a non-shared state channel, or to get a non-shared state channel (e.g., depending on whether the system creates channels upon application start-up, run-time, or both). Similarly, if a thread is to perform a shared-state modifying operation, the thread first obtain a handle to the shared state channel 507 (and a lock for accessing the shared state channel 507), and submit the I/O requests using the shared state channel. In another embodiment, the application can map the non-shared state channels to threads, and when a thread is to submit a request that modifies shared state, the thread can call a function to obtain the shared state channel 507.

By routing the operations that modify shared state to one I/O queue using a shared state channel, and routing the operations that do not modify shared state to different I/O queues using non-shared state channel, an application can execute requests that do not modify shared state in parallel without locking around the shared state. Although the examples of FIGS. 5A and 5B refer to a filesystem, other storage systems such as databases and K/V stores can also use typed channels to perform I/O operations. Different types of storage systems may expose different operations on the shared state channel and the non-shared state channels depending on how the storage system is organized.

Figure 6:
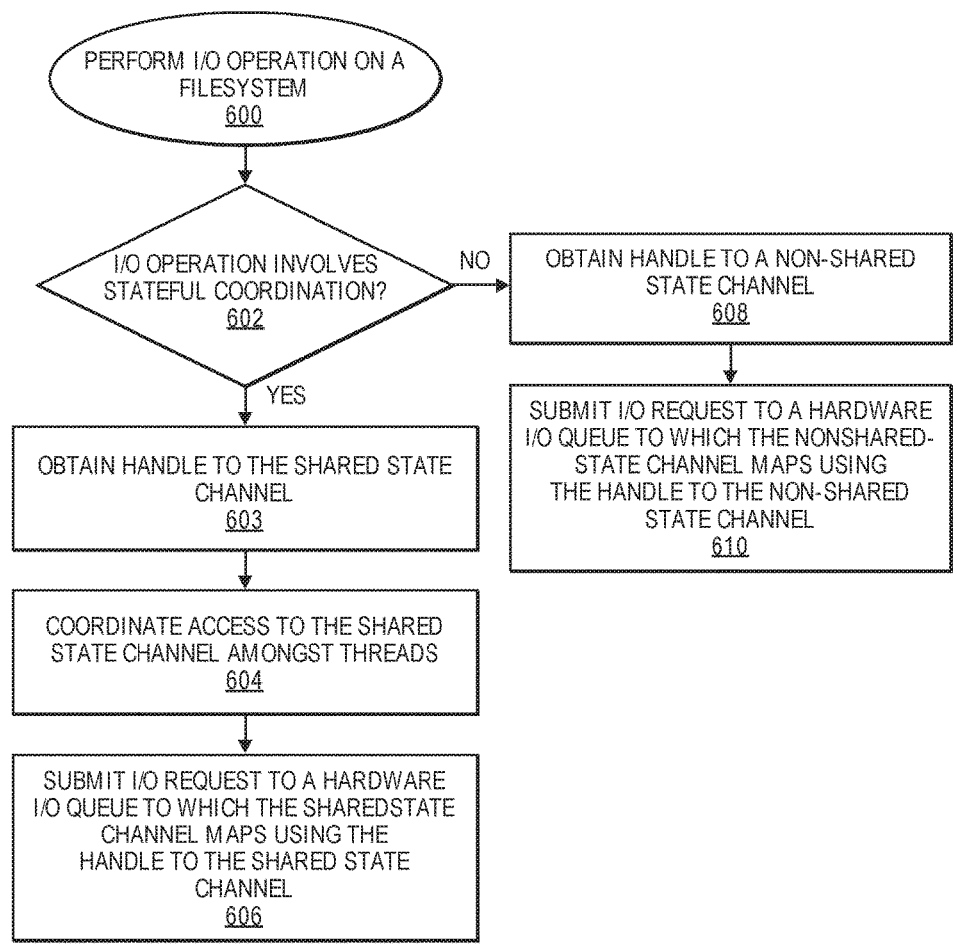
FIG. 6 is a flowchart of a method of using typed channels to perform I/O operations on a filesystem, in accordance with an embodiment.

FIG. 6 is a flowchart of a method of using typed channels to perform I/O operations on a filesystem, in accordance with an embodiment. The flow chart 600 begins by determining if a given I/O operation to be performed involves stateful coordination. Whether or not an I/O operation involves stateful coordination can be predetermined based on the type of operation. For example, the filesystem can define its operations based on whether the operations modify metadata channel. Examples of operations that modify metadata include creating, deleting, or resizing a file. Thus, in one embodiment, the application determines that such metadata-modifying operations involve stateful coordination. Examples of operations that do not modify metadata include reading from or writing to an existing file. In one embodiment, the application determines that such operations that do not modify metadata do not involve stateful coordination. If the I/O operation does not involve stateful coordination, 602 NO branch, the application can perform the I/O operation using a non-shared state channel (such as an "I/O" channel as described above with respect to FIG. 5A). Therefore, the application obtains a handle to a non-shared state channel, at operation 608. As mentioned above with respect to FIG. 5B, obtaining a handle to a non-shared channel can involve calling a function to either create or get a non-shared channel. After obtaining the handle to the non-shared state channel, the thread can submit the I/O request to the hardware I/O queue to which the channel maps, at operation 610.

If the I/O operation does involve stateful coordination, 602 YES branch, the application uses the shared state channel (such as the "metadata channel" described above with respect to FIG. 5A). Therefore, the application obtains a handle to a shared state channel, at operation 603. In one embodiment, obtaining a handle to the shared state channel involves calling a function to create or get the global shared state channel. After obtaining a handle to the shared state channel, the application coordinates access to the shared state channel amongst threads, at operation 604. For example, in one embodiment, coordinating access to the shared state channel involves acquiring a lock for the shared state channel to ensure other threads are not using the channel. In another embodiment, coordinating access to the shared state channel involves using the shared state channel from a single thread, and all other threads can pass requests to that single thread to perform their shared state operations. Once the application has coordinated access and determined that the thread can use the shared state channel, the application submits the I/O request to a hardware I/O queue to which the shared state channel maps using the handle, at operation 606.

Although FIGS. 5A-5B, and 6 and the corresponding description refer to a single shared state channel (such as a single metadata channel), in other embodiments, an application can create more than one shared state channel. For example, a storage device can include multiple unique regions on the device dedicated to storing metadata. In one such embodiment, the application can create a shared state channel corresponding to each shared state region (e.g., on the storage device. However, such embodiments can have an effect similar to partitioning the filesystem into multiple parts that do not communicate with one another.

FIG. 7 is an example of pseudocode for performing I/O operations using channels in a filesystem, in accordance with an embodiment. In one embodiment, the operations described in the pseudocode 700 are performed by an application, such as the application 202 of FIG. 2. The pseudocode of FIG. 7 begins with line 702, in which an application spawns N threads of execution. Pseudocode for performing I/O operations on each of the N threads begins on line 704. In the exemplary pseudocode, each thread is to obtain a handle to a global metadata channel, at line 706. Prior to performing I/O operations that modify metadata, the application synchronizes access to the metadata channel across threads, at line 708. Once the application has synchronized access to the metadata channel across threads, each of the N threads can perform metadata-modifying operations such as filed creation at line 710 and resizing the file at line 712. The threads use the metadata channel to submit the metadata-modifying operations, in accordance with an embodiment. After completing the operations that modify metadata, the application can end synchronization, at line 714.

At line 716, each thread creates an I/O channel, such as the I/O channels described above with respect to FIG. 5A. Each thread then uses the I/O channel to read from or write to the file, at line 718. Prior to ending the thread at line 722, the thread deletes the I/O channel that it created at line 720.

Figure 8:
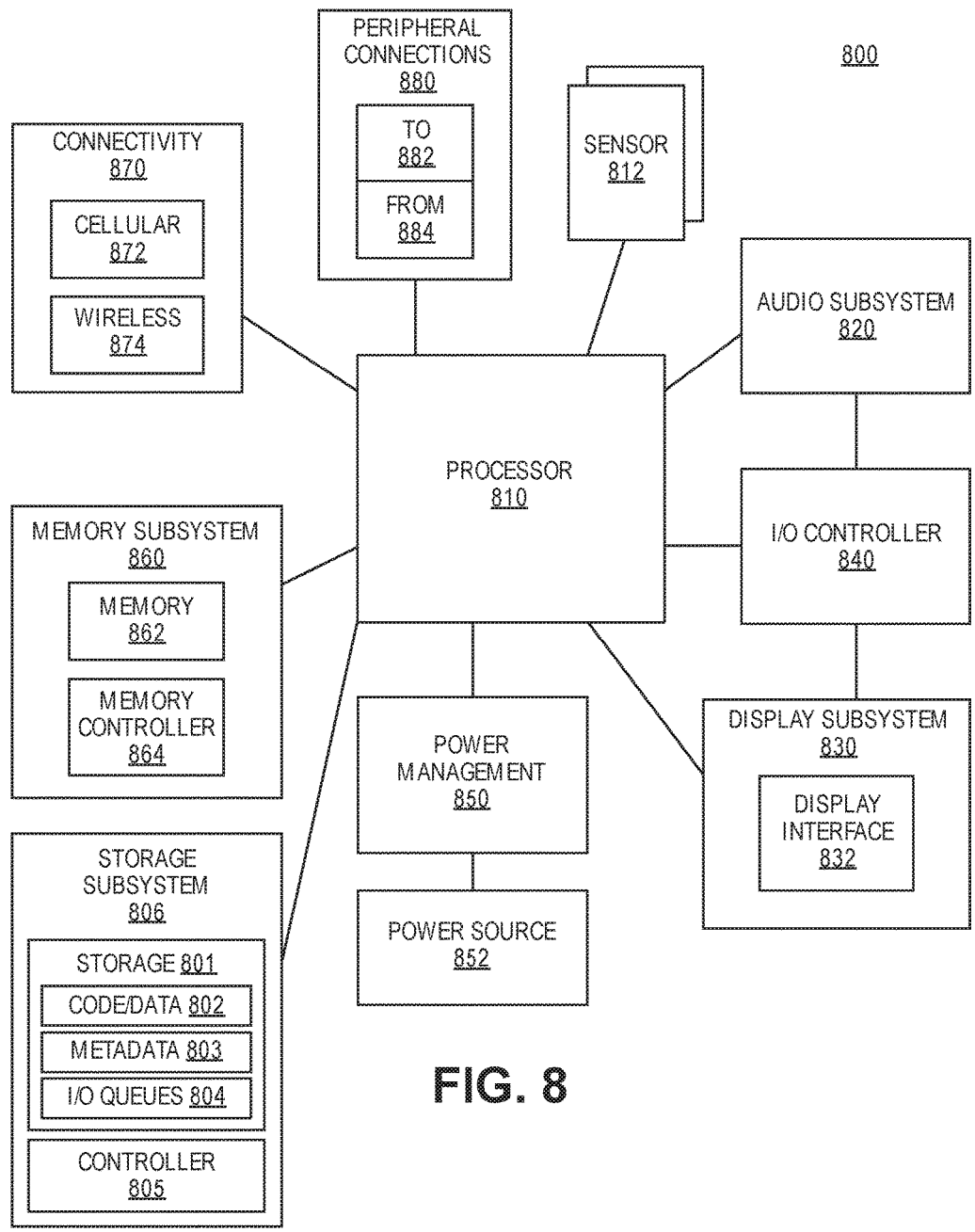
FIG. 8 is a block diagram of a mobile device in which channels can be implemented for accessing hardware I/O queues by software threads in a filesystem, in accordance with an embodiment.

FIG. 8 is a block diagram of a mobile device in which a method of controlling access to hardware I/O queues can be implemented, in accordance with an embodiment. Device 800 represents a mobile computing device, such as a computing tablet, a mobile phone or smartphone, a wireless-enabled e-reader, wearable computing device, or other mobile device, or an embedded computing device. It will be understood that certain of the components are shown generally, and not all components of such a device are shown in device 800.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and device functions are executed. The processing operations include operations related to I/O (input/output) with a human user or with other devices, operations related to power management, operations related to connecting device 800 to another device, or a combination. The processing operations can also include operations related to audio I/O, display I/O, or other interfacing, or a combination. Processor 810 can execute data stored in memory. Processor 810 can write or edit data stored in memory.

In one embodiment, system 800 includes one or more sensors 812. Sensors 812 represent embedded sensors or interfaces to external sensors, or a combination. Sensors 812 enable system 800 to monitor or detect one or more conditions of an environment or a device in which system 800 is implemented. Sensors 812 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, glucose monitors, or other sensors to detect medical or physiological attributes), or other sensors, or a combination. Sensors 812 can also include sensors for biometric systems such as fingerprint detectors, face detection or recognition systems, or other systems that detect or recognize user features. Sensors 812 should be understood broadly, and not limiting on the many different types of sensors that could be implemented with system 800. In one embodiment, one or more sensors 812 couples to processor 810 via a frontend circuit integrated with processor 810. In one embodiment, one or more sensors 812 couples to processor 810 via another component of system 800.

In one embodiment, device 800 includes audio subsystem 820, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 800, or connected to device 800. In one embodiment, a user interacts with device 800 by providing audio commands that are received and processed by processor 810.

Display subsystem 830 represents hardware (e.g., display devices) and software components (e.g., drivers) that provide a visual display for presentation to a user. In one embodiment, the display includes tactile components or touchscreen elements for a user to interact with the computing device. Display subsystem 830 includes display interface 832, which includes the particular screen or hardware device used to provide a display to a user. In one embodiment, display interface 832 includes logic separate from processor 810 (such as a graphics processor) to perform at least some processing related to the display. In one embodiment, display subsystem 830 includes a touchscreen device that provides both output and input to a user. In one embodiment, display subsystem 830 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one embodiment, display subsystem 830 generates display information based on data stored in memory and operations executed by processor 810.

I/O controller 840 represents hardware devices and software components related to interaction with a user. I/O controller 840 can operate to manage hardware that is part of audio subsystem 820, or display subsystem 830, or both. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 or display subsystem 830 or both. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one embodiment, I/O controller 840 manages devices such as sensors 812, accelerometers, cameras, light sensors or other environmental sensors, gyroscopes, global positioning system (GPS), or other hardware that can be included in device 800. The input can be part of direct user interaction, as well as providing environmental input to the system to influence its operations (such as filtering for noise, adjusting displays for brightness detection, applying a flash for a camera, or other features).

In one embodiment, device 800 includes power management 850 that manages battery power usage, charging of the battery, and features related to power saving operation. Power management 850 manages power from power source 852, which provides power to the components of system 800. In one embodiment, power source 852 includes an AC to DC (alternating current to direct current) adapter to plug into a wall outlet. Such AC power can be renewable energy (e.g., solar power, motion based power). In one embodiment, power source 852 includes only DC power, which can be provided by a DC power source, such as an external AC to DC converter. In one embodiment, power source 852 includes wireless charging hardware to charge via proximity to a charging field. In one embodiment, power source 852 can include an internal battery or fuel cell source.

Memory subsystem 860 includes memory device(s) 862 for storing information in device 800. Similar to the memory 130 described above with respect to FIG. 1, the memory devices 862 can store an OS, storage stack, applications, processes, and channels, in accordance with embodiments described above. Memory subsystem 860 can include nonvolatile (state does not change if power to the memory device is interrupted) or volatile (state is indeterminate if power to the memory device is interrupted) memory devices, or a combination. Memory 860 can store application data, user data, music, photos, documents, or other data, as well as system data (whether long-term or temporary) related to the execution of the applications and functions of system 800. In one embodiment, memory subsystem 860 includes memory controller 864 (which could also be considered part of the control of system 800, and could potentially be considered part of processor 810). Memory controller 864 includes a scheduler to generate and issue commands to memory device 862.

The device 800 also include a storage subsystem 806. The storage subsystem 806 includes one or more storage devices 801 and a controller 805 for controlling access to the storage devices 801. The storage devices 801 can be similar to or the same as the storage devices 184 described above with respect to FIG. 1. For example, as illustrated, the storage devices include one or more hardware I/O queues, which are described above with respect to FIG. 1. In accordance with an embodiment, storage includes a code/data region 802 and a metadata region 803 (such as the storage device 512 of FIG. 5A).

Connectivity 870 includes hardware devices (e.g., wireless or wired connectors and communication hardware, or a combination of wired and wireless hardware) and software components (e.g., drivers, protocol stacks) to enable device 800 to communicate with external devices. The external device could be separate devices, such as other computing devices, wireless access points or base stations, as well as peripherals such as headsets, printers, or other devices. In one embodiment, system 800 exchanges data with an external device for storage in memory or for display on a display device. The exchanged data can include data to be stored in memory, or data already stored in memory, to read, write, or edit data.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading, uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Some embodiments of the disclosure follow. In one embodiment, a method includes creating a channel to map exclusively to one hardware I/O queue of a storage device, wherein the channel comprises an instance of a software primitive in a filesystem stored at least in part on the storage device, to route I/O requests to access objects in the filesystem from an application executing on one or more threads to a hardware I/O queue to which the channel maps. The method further includes submitting the I/O requests to access the objects in the filesystem from at most one thread of the application at a given time to the hardware I/O queue using the channel. In one embodiment, a processor executing the application includes a multicore processor, wherein multiple cores execute the one or more threads. Submitting the I/O requests from the at most one thread at a given time to the hardware I/O queue is based on the channel used regardless of which core is executing the thread. In one embodiment, submitting the I/O requests from the at most one thread of the application at the given time involves exclusively mapping the one thread to the channel at the given time, and submitting the I/O requests using the channel to which the one thread is mapped.

In one embodiment, the method further involves prior to submitting the I/O requests using the channel, requiring the one thread to acquire a lock for the channel. In one embodiment, creating the channel involves calling a function that creates an instance of a channel primitive and returns a handle to the instance of the channel primitive and storing information in the instance of the channel primitive to identify the hardware I/O queue. In one embodiment, submitting the I/O requests involves calling an I/O function to perform an I/O operation on the filesystem with the handle to the channel, wherein the I/O function is to cause the I/O requests to be submitted to the hardware I/O queue to which the channel maps.

In one embodiment, creating the channel comprises creating a shared state channel, wherein the shared state channel is used only to submit I/O requests that modify shared state. In one embodiment, the shared state channel includes a metadata channel, wherein the metadata channel is used only to submit I/O requests that modify the metadata, and wherein the metadata comprises attributes of objects in the filesystem. In one embodiment, creating the channel includes creating a non-shared state channel, wherein the non-shared state channel is used only to submit I/O requests that do not modify shared state. In one embodiment, the method further involves creating a plurality of non-shared state channels and one shared state channel, wherein each of the plurality of non-shared state channels and the one shared state channel map exclusively to one of the plurality of hardware I/O queues. The channel used to submit the I/O requests is either the shared state channel or one of the plurality of non-shared state channels based on whether the I/O requests are to modify the shared state.

In one embodiment, the method further involves not acquiring a lock when submitting the I/O requests that do not modify the shared state via the non-shared state channel. In one embodiment, an article of manufacture including a computer readable storage medium having content stored thereon, which when executed causes a machine to perform operations to execute a method including creating a channel to map exclusively to one hardware I/O queue of a storage device, wherein the channel comprises an instance of a software primitive in a filesystem stored at least in part on the storage device, to route I/O requests to access objects in the filesystem from an application executing on one or more threads to a hardware I/O queue to which the channel maps, and submitting the I/O requests to access the objects in the filesystem from at most one thread of the application at a given time to the one hardware I/O queue using the channel.

In one embodiment, the method further involves not acquiring a lock prior to submitting the I/O requests to the one hardware I/O queue to which the channel maps. In one embodiment, the metadata for a given file in the filesystem includes one or more of: a size of the file, permission information for the file, information regarding when the file was accessed, and physical locations on the storage device that hold the file. In one embodiment, I/O requests that modify the metadata include one or more of: creation of a file, deletion of the file, and resizing the file. In one embodiment, I/O requests that do not modify shared state are submitted using an I/O channel, and wherein the I/O requests that do not modify the shared state include one or more of: reading from a file and writing to the file.

In one embodiment, a system includes a processor, and a storage device communicatively coupled with the processor. The storage device includes a plurality of hardware I/O queues. The storage device is to store an application comprising instructions, which when executed causes the processor to perform operations to: create a channel to map exclusively to one hardware I/O queue of the storage device, wherein the channel comprises an instance of a software primitive in a filesystem stored at least in part on the storage device, to route I/O requests to access the objects in the filesystem from the thread to the one hardware I/O queue to which the channel maps; and submit the I/O requests to access the objects in the filesystem from at most one thread of the application at a given time to the one hardware I/O queue using the channel. In one embodiment, the processor includes a multicore processor including a plurality of cores, wherein submission of the I/O requests from the at most one thread at a given time to the hardware I/O queue is based on the channel used regardless of which core of the multicore processor is executing the thread. In one embodiment, the system further includes a memory communicatively coupled with the processor, wherein the memory is to store the instructions of the application during execution of the application. In one embodiment, the system further includes any of a display communicatively coupled to the processor, a network interface communicatively coupled to the processor, or a battery coupled to provide power to the system.

In one embodiment, a method of performing input/output (I/O) operations on a data storage system stored at least in part on a storage device, wherein the storage device comprises a plurality of hardware I/O queues, involves obtaining a handle to a channel, wherein the channel comprises an instance of a software primitive in the data storage system to route I/O requests to access objects in the data storage system to a single hardware I/O queue to which the channel exclusively maps. The method involves calling a function to access objects in the data storage system, wherein calling the function includes providing the handle to the channel. The function to access the objects in the data storage system is to cause an I/O request to be submitted to the hardware I/O queue to which the channel exclusively maps. In one embodiment, the data storage system includes one of a database, a filesystem, and a key/value (K/V) store.

Thus, channels for accessing hardware I/O queues by software threads performing I/O requests on a storage system are described. Although many examples are described in terms of a filesystem, the examples also apply to other data storage systems such as databases, K/V stores, or other systems for storing data. In one embodiment, channels enable reducing or eliminating the use of locks to coordinate use of the hardware I/O queues. In one embodiment, typed channels further enable reducing or eliminating locks used to coordinate reading and writing from the same locations on the storage device (in addition to the locks for the hardware I/O queues).

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware, software, or a combination. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Operations can be combined or broken down into sub-operations. Other process flows are possible.

To the extent various operations or functions are described herein, they can be described or defined as software code, instructions, configuration, data, or a combination. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals, or both, to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    creating a channel to map exclusively to one hardware I/O queue of a storage device, wherein the channel comprises an instance of a software primitive in a filesystem stored at least in part on the storage device, to route I/O requests to access objects in the filesystem from an application executing on one or more threads to a hardware I/O queue to which the channel maps; and
    submitting the I/O requests to access the objects in the filesystem from at most one thread of the application at a given time to the hardware I/O queue using the channel.

2. The method of claim 1, wherein:
    a processor executing the application comprises a multi-core processor, wherein multiple cores execute the one or more threads; and
    wherein submitting the I/O requests from the at most one thread at a given time to the hardware I/O queue is based on the channel used regardless of which core is executing the thread.

3. The method of claim 1, wherein submitting the I/O requests from the at most one thread of the application at the given time comprises:
   exclusively mapping the one thread to the channel at the given time; and
   submitting the I/O requests using the channel to which the one thread is mapped.

4. The method of claim 1, further comprising:
   prior to submitting the I/O requests using the channel, requiring the one thread to acquire a lock for the channel.

5. The method of claim 1, wherein creating the channel comprises:
   calling a function that creates an instance of a channel primitive and returns a handle to the instance of the channel primitive; and
   storing information in the instance of the channel primitive to identify the hardware I/O queue.

6. The method of claim 5, wherein submitting the I/O requests comprises:
   calling an I/O function to perform an I/O operation on the filesystem with the handle to the channel, wherein the I/O function is to cause the I/O requests to be submitted to the hardware I/O queue to which the channel maps.

7. The method of claim 1, wherein:
   creating the channel comprises creating a shared state channel; and
   wherein the shared state channel is used only to submit I/O requests that modify shared state.

8. The method of claim 7, wherein:
   the shared state channel comprises a metadata channel;
   wherein the metadata channel is used only to submit I/O requests that modify the metadata; and
   wherein the metadata comprises attributes of objects in the filesystem.

9. The method of claim 1, wherein:
   creating the channel comprises creating a non-shared state channel; and
   wherein the non-shared state channel is used only to submit I/O requests that do not modify shared state.

10. The method of claim 1, further comprising:
    creating a plurality of non-shared state channels and one shared state channel, wherein each of the plurality of non-shared state channels and the one shared state channel map exclusively to one of a plurality of hardware I/O queues;
    wherein the channel used to submit the I/O requests is either the shared state channel or one of the plurality of non-shared state channels based on whether the I/O requests are to modify the shared state.

11. The method of claim 10, further comprising:
    not acquiring a lock when submitting the I/O requests that do not modify the shared state via the non-shared state channel.

12. An article of manufacture comprising a non-transitory computer readable storage medium having content stored thereon, which when executed causes a machine to perform operations to execute a method comprising:
    creating a channel to map exclusively to one hardware I/O queue of a storage device, wherein the channel comprises an instance of a software primitive in a filesystem stored at least in part on the storage device, to route I/O requests to access objects in the filesystem from an application executing on one or more threads to a hardware I/O queue to which the channel maps; and
    submitting the I/O requests to access the objects in the filesystem from at most one thread of the application at a given time to the one hardware I/O queue using the channel.

13. The article of manufacture of claim 12, wherein:
    a processor executing the application comprises a multi-core processor, wherein multiple cores execute the one or more threads; and
    wherein submitting the I/O requests from the at most one thread at a given time to the hardware I/O queue is based on the channel used regardless of which core is executing the thread.

14. The article of manufacture of claim 12, wherein submitting the I/O requests from the at most one thread of the application at the given time comprises:
    exclusively mapping the one thread to the channel at the given time; and
    submitting the I/O requests using the channel to which the one thread is mapped.

15. The article of manufacture of claim 12, the method further comprising:
    prior to submitting the I/O requests using the channel, requiring the one thread to acquire a lock for the channel.

16. The article of manufacture of claim 12, wherein creating the channel comprises:
    calling a function that creates an instance of a channel primitive and returns a handle to the instance of the channel primitive, wherein using; and
    storing information in the instance of the channel primitive to identify the hardware I/O queue.

17. The article of manufacture of claim 16, wherein submitting the I/O requests comprises:
    calling an I/O function to perform an I/O operation on the filesystem with the handle to the channel, wherein the I/O function is to cause the I/O requests to be submitted to the hardware I/O queue to which the channel maps.

18. The article of manufacture of claim 12, wherein:
    creating the channel comprises creating a shared state channel; and
    wherein the shared state channel is used only to submit I/O requests that modify shared state.

19. A system comprising:
    a processor;
    a storage device communicatively coupled with the processor, the storage device comprising a plurality of hardware I/O queues, wherein the storage device is to store an application comprising instructions, which when executed causes the processor to perform operations to:
        create a channel to map exclusively to one hardware I/O queue of the storage device, wherein the channel comprises an instance of a software primitive in a filesystem stored at least in part on the storage device, to route I/O requests to access objects in the filesystem to the one hardware I/O queue to which the channel maps; and
        submit the I/O requests to access the objects in the filesystem from at most one thread of the application at a given time to the one hardware I/O queue using the channel.

20. The system of claim 19, wherein:
    the processor comprises a multicore processor including a plurality of cores; and
    wherein submission of the I/O requests from the at most one thread at a given time to the hardware I/O queue is based on the channel used regardless of which core of the multicore processor is executing the thread.

21. The system of claim 19, further comprising:
a memory communicatively coupled with the processor, wherein the memory is to store the instructions of the application during execution of the application.

22. The system of claim 19, further comprising: any of a display communicatively coupled to the processor, a network interface communicatively coupled to the processor, or a battery coupled to provide power to the system.

* * * * *